United States Patent
Suumäki et al.

(10) Patent No.: US 7,266,081 B2
(45) Date of Patent: Sep. 4, 2007

(54) METHOD AND SYSTEM FOR ARRANGING DATA FLOW CONTROL IN A DATA TRANSFER SYSTEM

(75) Inventors: Jan Suumäki, Tampere (FI); Jouni Lappi, Nokia (FI); Bimal Shrestha, Tampere (FI)

(73) Assignee: Nokia Corporation, Espoo (FI)

( * ) Notice: Subject to any disclaimer, the term of this patent is extended or adjusted under 35 U.S.C. 154(b) by 921 days.

(21) Appl. No.: 10/454,964

(22) Filed: Jun. 5, 2003

(65) Prior Publication Data

US 2005/0254425 A1   Nov. 17, 2005

(51) Int. Cl.
*G01R 31/08* (2006.01)
*H04L 12/23* (2006.01)

(52) U.S. Cl. ............... 370/235; 370/231; 370/395.5; 370/395.42; 370/469; 709/224; 709/233

(58) Field of Classification Search ............ None
See application file for complete search history.

(56) References Cited

U.S. PATENT DOCUMENTS 6,233,224 B1 * 5/2001 Yamashita et al. ......... 370/231
6,463,035 B1   10/2002 Moore
6,798,764 B2 * 9/2004 Jiang .................... 370/349

FOREIGN PATENT DOCUMENTS

| EP | 0 905 950 A1 | 3/1999 |
| EP | 1 274 214 A2 | 1/2003 |
| WO | WO 01/37493 A1 | 5/2001 |
| WO | WO 02/33909 A1 | 4/2002 |

* cited by examiner

*Primary Examiner*—Rafael Perez-Gutierrez
*Assistant Examiner*—Suk Jin Kang
(74) *Attorney, Agent, or Firm*—Hollingsworth & Funk, LLC (57) ABSTRACT

The invention relates to arranging data flow control in a data transfer system comprising a sender and at least two protocol entities serving the transmission of data from the sender. The originating protocol entity of a suspension request primitive is checked. Suspension is set as the data transmission status for the protocol entity that has originated a suspension request primitive. The originating protocol entity of a resume request primitive is checked before sending it to the sender. Also the status information is checked. Transmission of the resume request primitive to the sender is prevented if suspension is set for any other protocol entity than the originating protocol entity of the resume request primitive.

15 Claims, 5 Drawing Sheets

METHOD AND SYSTEM FOR ARRANGING DATA FLOW CONTROL IN A DATA TRANSFER SYSTEM

FIELD OF THE INVENTION

The present invention relates to arranging data flow control, and more particularly to suspending and resuming data flows.

BACKGROUND OF THE INVENTION

In ordinary wireless data transmission the radio link level handles flow control, i.e. suspends and resumes the data flow. Usually a sender (either an internal application such as an MMS application (Multimedia Messaging Service) or an external dial-up device, e.g. a laptop) of the uplink data is faster than air interface, and an efficient flow control mechanism is needed for optimal data throughput. For arranging data flow control it is feasible to apply buffering and/or a suspension functionality. When suspension functionality is applied, the lower layer protocol entity may send a suspension request primitive to the sender which then suspends data transmission. In response to a resume request, the data transmission is resumed.

In the $2^{nd}$ generation GSM/GPRS and in the $3^{rd}$ generation UMTS of 3GPP ($3^{rd}$ Generation Partnership Project) system the radio links are mainly handled by a radio link layer (RLC) protocol. However, there are several other layers besides the RLC layer, which can start flow control mechanisms for their own purposes (not necessarily related to actual data transmission). The same applies for resuming data transmission, i.e. any underlying protocol layer entity can send the resume request to the sender. In uplink flow control, the sender cannot know which layer and why the data transmission is suspended or resumed, because the flow control primitives are the same regardless of the layer sending them. For instance, if the RLC layer entity in the GPRS stack suspends data transmission, this suspension request primitive is routed via upper layers, i.e. logical link control (LLC), sub-network dependent convergence protocol (SNDCP) and some implementation specific layers to the sender. But there is no difference from the sender point of view if suspension is initiated from some other layer, e.g. SNDCP layer. In data transmission suspension, it does not matter if the sender receives several suspension primitives from different lower layers. Data transmission is suspended after the first primitive and the following primitives can be ignored. In data transmission resume, when the sender receives the first resume request primitive, it starts again uplink data transmission. However, in this case certain layers which have also initiated suspension, but have not yet sent a resume request might not be ready to receive uplink data. Depending on the layer implementation, such layer may discard data packets, or buffer the data until buffers are full and then discard, or do something else which is not optimal for data transmission. Data discarding is especially harmful in TCP/IP data transmission, because TCP will start slow-start mechanism after data loss and thus data throughput suffers.

BRIEF DESCRIPTION OF THE INVENTION

An object of the present invention is thus to enhance data flow control such as to alleviate the above disadvantages. The objects of the invention are achieved by a method, a system, a data processing device and a software program product which are characterized by what is stated in the independent claims. The preferred embodiments of the invention are disclosed in the dependent claims.

The invention is based on the idea of arranging intelligent filtering functionality for data flow control primitives. The originating protocol entity of a suspension request primitive for the sender is checked. Suspension is set as the data transmission status for the protocol entity that has originated a suspension request primitive. The originating protocol entity of a resume request primitive is checked before transmitting the resume request primitive for resuming data flow by the sender, i.e. before transmitting it to the sender or to another protocol entity before the sender. Also the status information is checked. Transmission of the resume request primitive is prevented if suspension is set for any other protocol entity than the originating protocol entity of the resume request primitive.

The suspension status refers generally to any kind of information indicating that the protocol entity is not capable of data transfer for some reason. A protocol entity refers to a functional entity, typically implemented by software, which takes care of the tasks of a protocol layer and, among other things, controls the sending and receiving of primitives between protocol entities. The originating protocol entity may be the protocol entity implementing the method or another protocol entity, which is under the protocol entity implementing the method in the protocol stack of the system. The originating protocol entity does not necessarily refer to a protocol entity that has sent a primitive for the first time as the originating protocol entity is considered from the viewpoint of the protocol entity implementing the method which may not get any information on primitives sent between underlying protocol layers. An advantage of the data flow control according to the invention is that the problems related to flow control functions initiated from several protocol layers can be avoided. The invention makes it possible to avoid or at least reduce too early resumptions so that the data flow is not resumed until every protocol entity is capable of continuing data transfer. Furthermore, the invention does not necessitate any changes to the functionality of the sender.

According to a preferred embodiment, the method is applied in each protocol entity, except in the lowest protocol entity, capable of initiating data flow control and underlying the sender in the protocol stack of the system. This makes it possible to completely avoid too early resumption of the uplink data transmission.

BRIEF DESCRIPTION OF THE DRAWINGS

In the following, the invention will be described in greater detail by means of preferred embodiments with reference to the accompanying drawings, in which FIG. 1 generally illustrates the elements of a UMTS system.

DETAILED DESCRIPTION OF THE INVENTION

Figure 1:
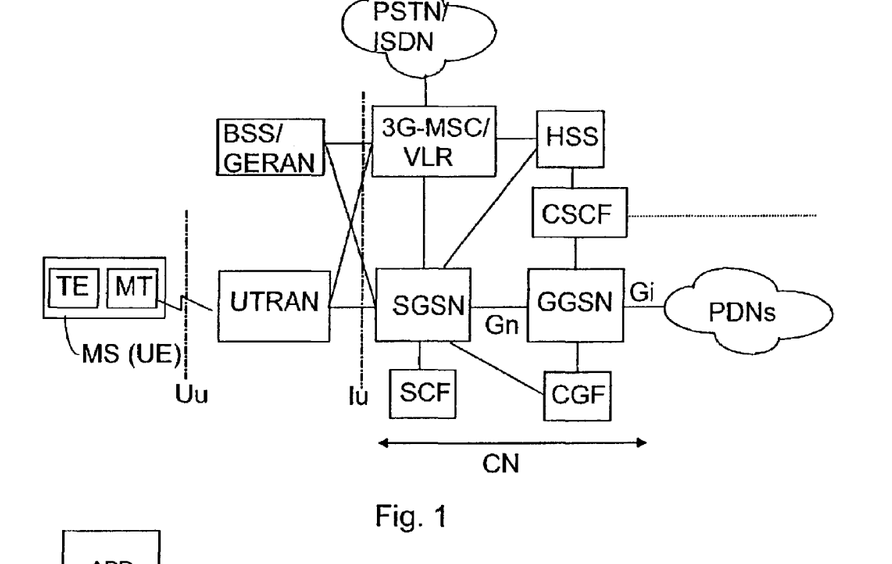

Reference is made to FIG. 1, wherein the main parts of a mobile system include a core network CN and a UMTS terrestrial radio access network UTRAN, which constitute the fixed network of the mobile system, and a mobile station MS, also called user equipment UE. The interface between the CN and the UTRAN is called Iu, and the air interface between the UTRAN and the MS is called Uu.

The UTRAN is typically composed of several radio network subsystems RNS, the interface between which is called Iur (not shown). The RNS is composed of a radio network controller RNC and one or more base stations BS, for which the term node B is also used. The interface between the RNC and the BS is called Iub. The base station BS attends to implementing the radio path and the radio network controller RNC manages radio resources. A connection to the UMTS core network CN can also be set up via a GSM base station subsystem BSS or a GSM/EDGE radio access network (Enhanced Data rates for GSM Evolution) GERAN.

The core network CN is composed of an infrastructure of a mobile system external to the UTRAN. In the core network, a mobile services switching centre/visitor location register 3G-MSCNLR attends to circuit-switched calls and communicates with a home subscriber server HSS. The connection to the serving GPRS support node SGSN of a packet radio system is set up via an interface Gs' and to the fixed telephone network PSTN/ISDN via a gateway MSC GMSC (not shown). The connection of both the mobile services switching centre 3G-MSCNLR and the serving GPRS support node SGSN to the radio network UTRAN (UMTS Terrestrial Radio Access Network) is set up via the interface Iu.

The UMTS system thus also comprises a packet radio system, which is largely implemented in accordance with a GPRS system connected to a GSM network, which also accounts for the references to the GPRS system in the network element names. The packet radio system of the UMTS may comprise several gateway GPRS support nodes and serving GPRS support nodes, and typically several serving GPRS support nodes SGSN are connected to one gateway GPRS support node GGSN. The task of the serving GPRS support node SGSN is to detect mobile stations capable of packet radio connections within its service area, to transmit and receive data packets from said mobile stations and to monitor the location of the mobile stations within its service area. Furthermore, the serving GPRS support node SGSN communicates with the home subscriber server HSS via the interface Gr. Records including the content of subscriber-specific packet data protocols are also stored in the home subscriber server HSS.

The gateway GPRS support node GGSN operates as a gateway between the packet radio system of the UMTS network and an external packet data network PDN. External data networks include for instance the UMTS or GPRS network of another network operator, the Internet or a private local area network. The gateway GPRS support node GGSN communicates with said data networks via an interface Gi. The data packets transferred between the gateway GPRS support node GGSN and the serving GPRS support node SGSN are always encapsulated in accordance with a gateway tunneling protocol GTP. The gateway GPRS support node GGSN also comprises the addresses of PDP contexts (Packet Data Protocol) activated for the mobile stations and the routing information, i.e. for instance the SGSN addresses. Routing information is thus used for linking data packets between an external data network and the serving GPRS support node SGSN. The network between the gateway GPRS support node GGSN and the serving GPRS support node SGSN is a network utilizing the IP communication protocol. A packet data system may also comprise many other functions, of which FIG. 1 shows a control function SCF for intelligent network services, preferably CAMEL services, and a charging gateway CGF attending to charging. Of the elements of the IMS system, FIG. 1 also illustrates a call session control function CSCF.

Figure 2:
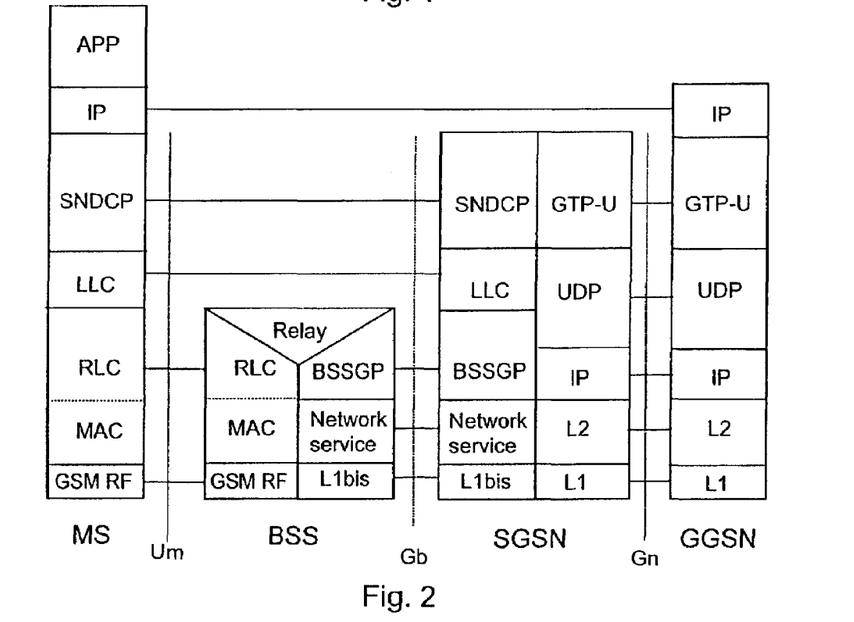
FIG. 2 shows UMTS user-plane protocol architecture.

FIG. 2 illustrates a 2G GPRS protocol stack which is used in the GSM/GPRS system and in the UMTS system when employing a BSS access network (A/Gb mode). Subnetwork Dependent Convergence Protocol (SNDCP) under the IP layer and application layer APP is employed between the MS and the SGSN to map network-level characteristics onto the characteristics of the underlying network. Logical Link Control (LLC) is also controlled by SGSN. LLC layer provides reliable ciphered logical link. Under LLC there is RLC/MAC layer providing GSM specific radio link control and medium access control functions. The Base Station System GPRS Protocol (BSSGP) layer conveys routing- and QoS-related information between the BSS and the SGSN. A person skilled in the art is familiar with protocol layers of the GSM/GPRS system.

Figure 3:
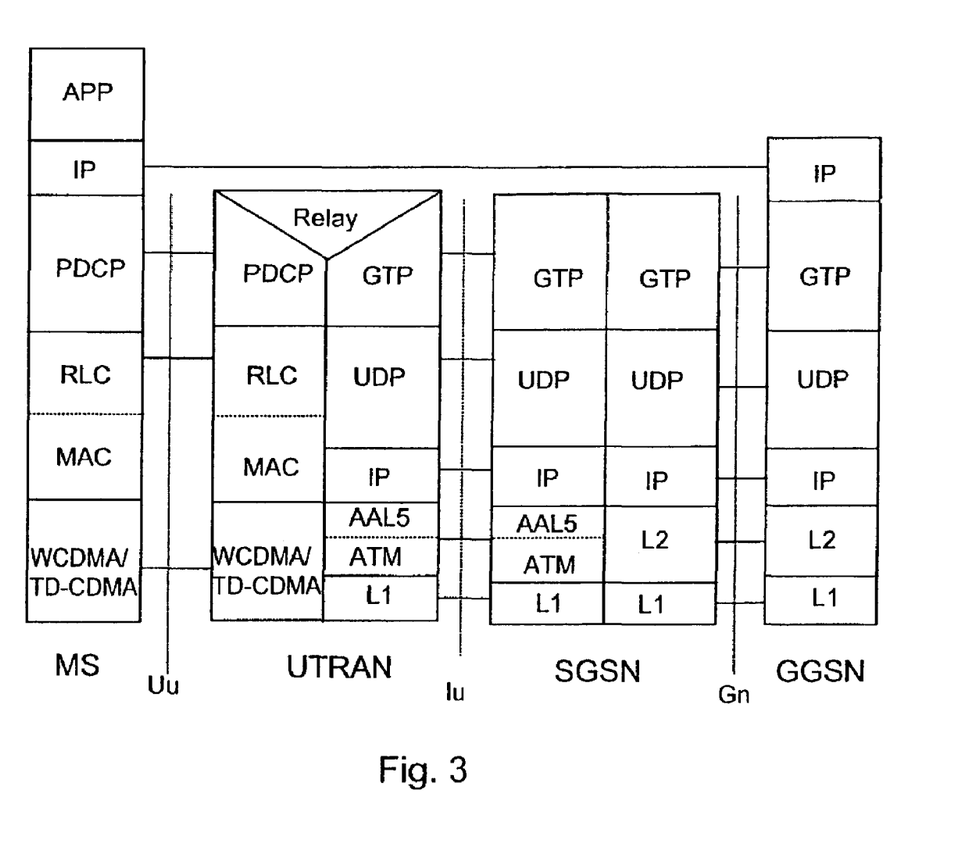
FIG. 3 shows GPRS user-plane protocol architecture.

The UMTS packet data protocol architecture is divided into a user plane and a control plane. The control plane comprises UMTS-specific signaling protocols. FIG. 3 illustrates the user plane, which delivers user data in protocol data units (PDU) between a mobile station and a GGSN. At the interface Uu between the radio network UTRAN and a mobile station MS, lower-level data transfer at the physical layer L1 takes place in accordance with the WCDMA or the TD-CDMA protocol. The MAC layer, on top of the physical layer, transfers data packets between the physical layer and the RLC layer (Radio Link Control), and the RLC layer attends to the management of the radio links of different logical connections. The functionalities of the RLC comprise for instance the segmentation of data to be transmitted into one or more RLC data packets. It is possible to compress the header fields comprised by the data packets of the PDCP layer (PDCP-PDU) on top of the RLC. The data packets are segmented and then transferred in RLC frames, to which address and checking information, vital to data transfer, is added. The RLC layer offers the capability of quality of service QoS definition to the PDCP layer and attends also to the retransmission of damaged frames in acknowledged transfer mode (other modes are transparent transfer and unacknowledged transfer), i.e. performs error correction. The PDCP, RLC and MAC constitute a transfer link layer. The serving GPRS support node SGSN attends to the routing of data packets incoming via the radio network RAN from the mobile station MS further to the correct gateway GPRS support node GGSN. This connection employs the tunneling protocol GTP, which encapsulates and tunnels all user data and signaling forwarded via the core network. The GTP protocol is run over the IP employed by the core network. The IP protocol can be used in a UMTS network for two different purposes. The upper IP layer is a so-called application layer IP, which is used between the MS and the GGSN and to a peer device in an external IP network. The TCP or UDP protocols, utilized by applications APP, can be executed on top of the upper IP layer. The application layer APP also has a SIP functionality, which is able to communicate with the CSCF. It is to be noted that applications APP and the upper IP stack can be located in a separate data terminal (TE; Terminal Equipment), a separate mobile terminal part MT acting as the communication device to the UMTS network. An example of this kind of a wireless terminal is a combination of a portable computer and a UMTS card phone.

To obtain packet-switched services, a mobile station MS has to perform an attach procedure, making the location of the MS known at the serving GPRS support node SGSN. The MS is then able to receive short messages and calls from the serving GPRS support node SGSN. To receive and transmit packet-switched data, the MS has to activate at least one PDP context that makes the MS known at the gateway GPRS support node GGSN and creates a logical data transfer context at the mobile station MS, the serving GPRS support node SGSN and the gateway GPRS support node GGSN. When the PDP context is being created, a PDP address, which could be an IPv4 or IPv6 address (when PDP type is IP), is defined for the MS. The PDP address is defined, in addition to other PDP context data, such as the negotiated QoS profile, in a context table maintained by the GGSN.

According to a preferred embodiment of the invention intelligent filtering of flow control primitives is arranged in at least one protocol entity for which there is at least one underlying protocol layer. The filtering functionality can be implemented in any protocol layer under the sender, e.g. the TCP/IP-stack and capable of initiating data flow control.

Figure 4:
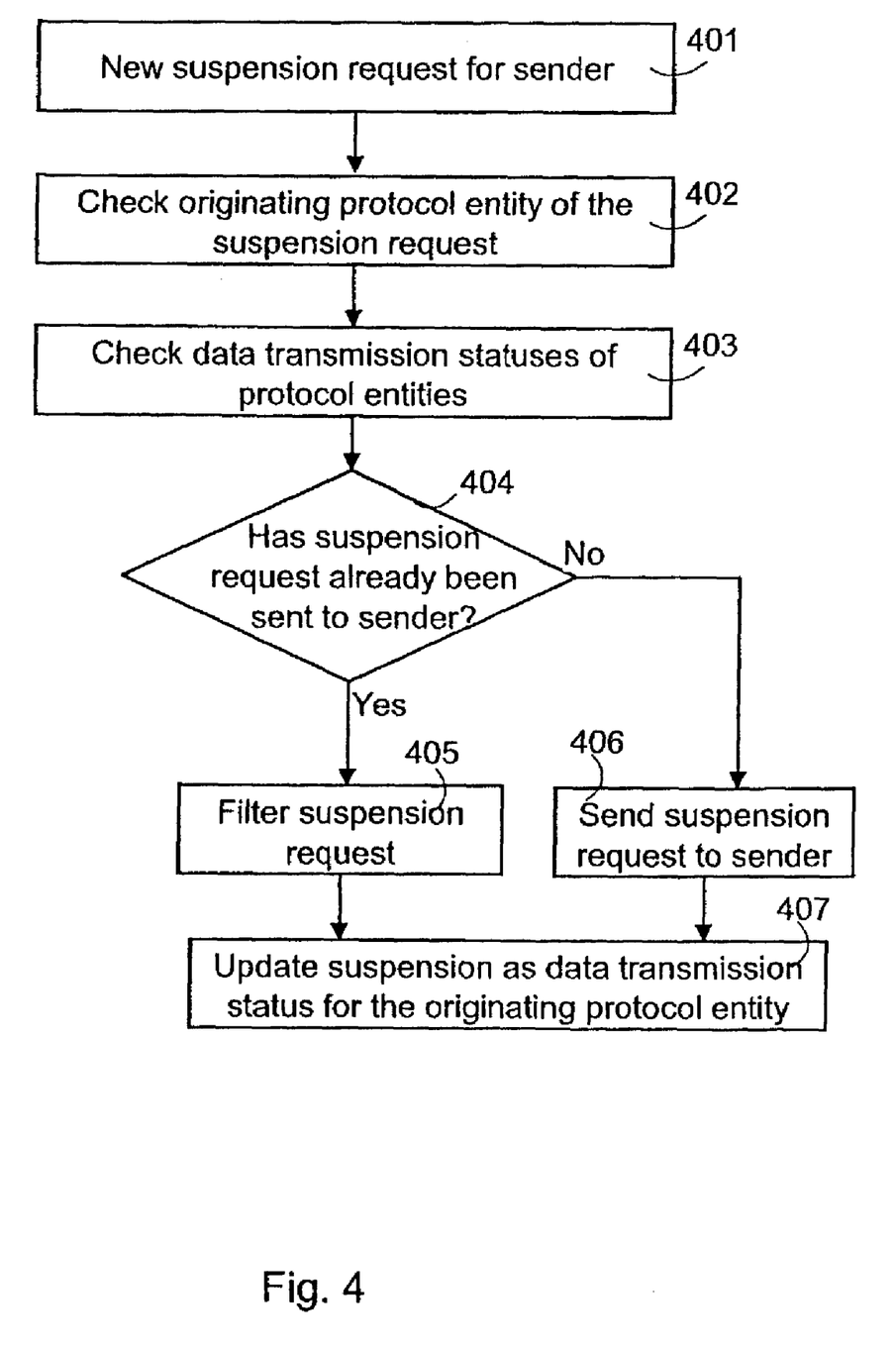
FIG. 4 illustrates a data flow control method according to a preferred embodiment of the invention.

FIG. 4 illustrates a data flow control method according to a preferred embodiment of the invention, more particularly the handling of suspension request primitives for a data flow as carried out by a protocol entity implementing the filtering functionality. The method is initiated in step 401 when a new suspension request primitive for the data flow is originated for the sender. The suspension request primitive may be received from an underlying protocol layer or it may originate from the protocol entity applying the method in FIG. 4. The originating protocol entity of the suspension request primitive is checked 402. In step 403, the data transmission statuses of the followed protocol entities are checked. This means that at least the status of at least one other protocol entity (which is not the originator of the current suspension request primitive) is checked.

According to a preferred embodiment, status information is maintained on at least one underlying protocol entity and the protocol entity applying the method. Further, the data transmission status information preferably indicates whether the protocol entity has originated a suspension request primitive, i.e. has requested suspension. In this case the status for the protocol entity is suspension. As will be described in FIG. 5, the status may be changed by a resume request primitive. The status information may be arranged in many ways. For instance, each protocol layer is associated with indicator "OFF" when suspension has been requested and with indicator "ON" when suspension has not been requested or when resumption has been requested after suspension. Another example is to only maintain information about protocol entities that have suspension as their status.

In step 404 it is checked whether a suspension request primitive has already been sent to the sender. This can be found out from the data transmission statuses of the followed protocol entities, i.e. if the status of some protocol entity indicates suspension, the suspension request primitive has already been sent to the sender. In this case the current suspension request primitive can be filtered 405, i.e. prevented from being sent to the sender. Step 405 is preferable as it enables to reduce the amount of processed primitives.

However, it is not necessary as the sender may ignore further suspension request primitives. If suspension has not been set for any protocol entity, the current suspension request primitive is the first one and is sent 406 to the sender. After receiving the suspension request primitive, the sender suspends the data flow.

After steps 405 and 406 the status of the protocol entity originating the current resume request primitive is updated 407 to indicate capability to resume. For instance, this may be done simply by removing the suspension status.

Figure 5:
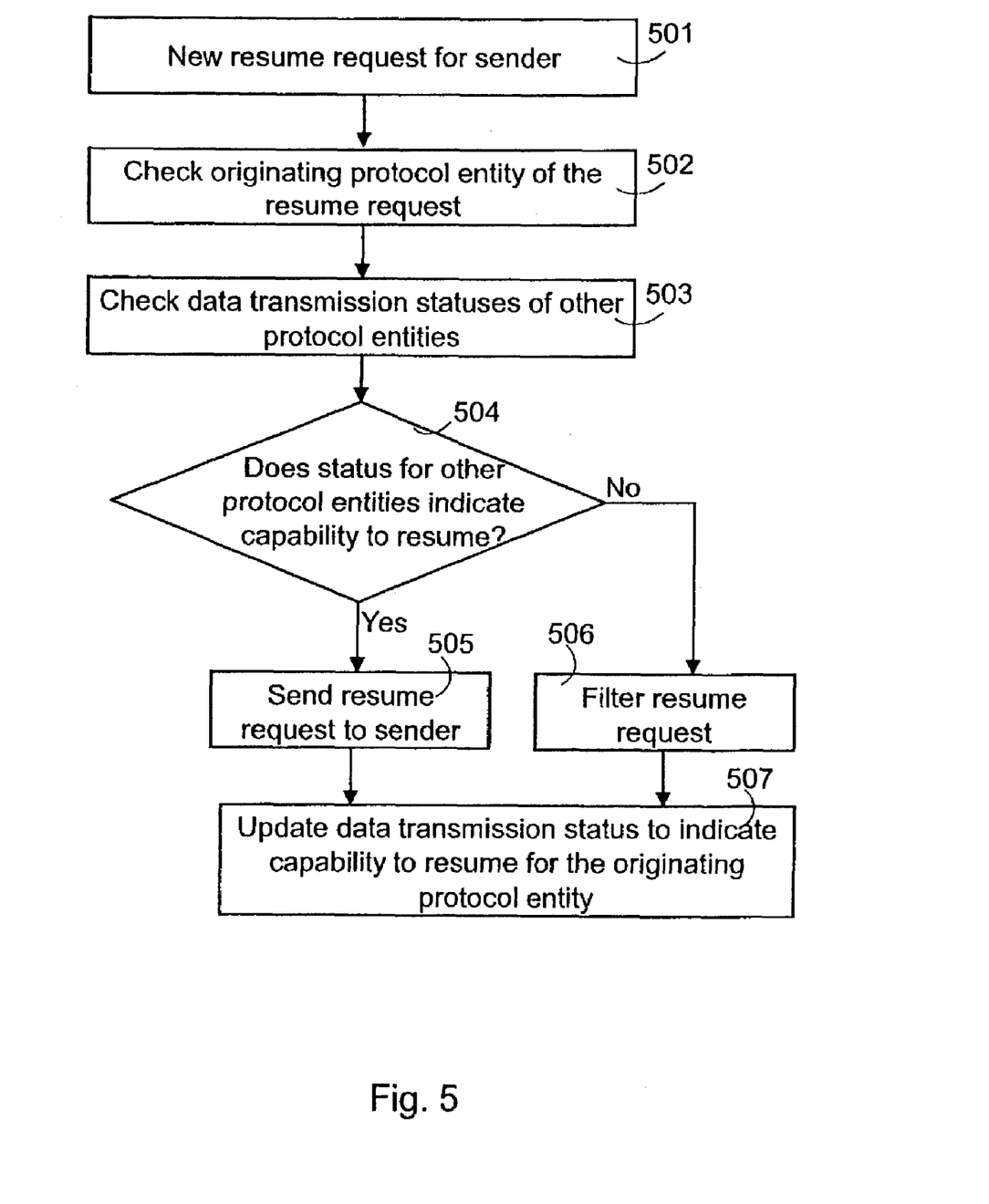
FIG. 5 illustrates a data flow control method according to a preferred embodiment of the invention.

FIG. 5 illustrates the data flow control method according to a preferred embodiment of the invention, more particularly than handling of resume request primitives for a data flow. The method is initiated in step 501 when a new resume request primitive for the data flow is originated for the sender. According to a preferred embodiment, the method is only initiated for a suspended data flow as resume request primitives are only sent if suspension request primitive has been sent earlier, and preferably the first suspension request primitive is always sent to the sender. The resume request primitive may be received from an underlying protocol layer or it may originate from the protocol entity applying the method in FIG. 5. Before the resume request primitive is sent to the sender (or upper layer), the originating protocol entity of the suspension request primitive is checked 502. In step 503, the data transmission status of at least one other followed protocol entity is checked. In step 504 it is checked whether the statuses for other protocol entities indicate capability to resume. As already illustrated, there may be explicit status information indicating this capability or, if there is no suspension status for a protocol entity, the status is implicitly interpreted to indicate capability to resume (e.g. if the protocol entity has never sent a suspension request).

If all the checked statuses indicate capability to resume, a resume request primitive is sent 505 to the sender. As response to this primitive, the sender may then resume data transmission. If, based on the check 504, there is at least one protocol entity for which the status indicates non-capability to resume, e.g. the status is suspension, the resume request primitive is filtered in step 506. Step 506 is preferable, because it enables further reducing of the amount of processed primitives.

After steps 505 and 506 the status of the originating protocol entity is updated 507 to indicate suspension.

The methods described in FIGS. 4 and 5 are preferably both applied in at least one protocol entity to provide intelligent filtering of flow control primitives. Naturally the filtering functionality for uplink data flow control is implemented at the highest possible layer under the sender as lower layers do not get any information about the primitives initiated by upper layers. According to a preferred embodiment, the data transmission status information is maintained according to FIGS. 4 and 5 by the protocol entity applying the method. Furthermore, according to a preferred embodiment, the data transmission status information is maintained, preferably according to FIGS. 4 and 5, only on the protocol entity applying the present method and on the protocol entity underlying the protocol entity applying the method in the protocol stack of the system. In other words, the protocol entity applying the present method, maintains status information on it's own status and the status of the lower layer. Thus these protocol entities are the 'followed' protocol entities in view of steps 403 and 503. This means that the protocol entity comprising the filtering functionality only checks the primitives originated from itself (either based on the need for the primitive or an already created primitive) and the primitives from one underlying protocol entity. This enables the filtering functionality and the maintenance of status information to be very simple. If the system comprises a first protocol entity and a second protocol entity, wherein the first protocol entity is serving the second protocol entity in the protocol stack of the system, the second protocol entity may thus be arranged to maintain status information only for the second protocol entity and the underlying first protocol entity irrespective of whether the primitive from the first protocol entity layer has been originated as a response to a primitive from some third protocol entity of a protocol layer underlying the first protocol layer. Thus the second protocol entity implementing the method considers the first protocol entity as the originating protocol entity. It is also feasible to maintain status information of every protocol layer (under the sender) by one (or more) protocol entity, but this would necessitate that information of the original initiator of a primitive is associated with the primitive and transferred between the protocol entities.

According to a preferred embodiment, the present method is applied in each protocol entity, except in the lowest protocol entity, underlying the sender in the protocol stack of the system. This embodiment makes it possible to completely avoid too early resumption of the uplink data transmission.

Figure 6:
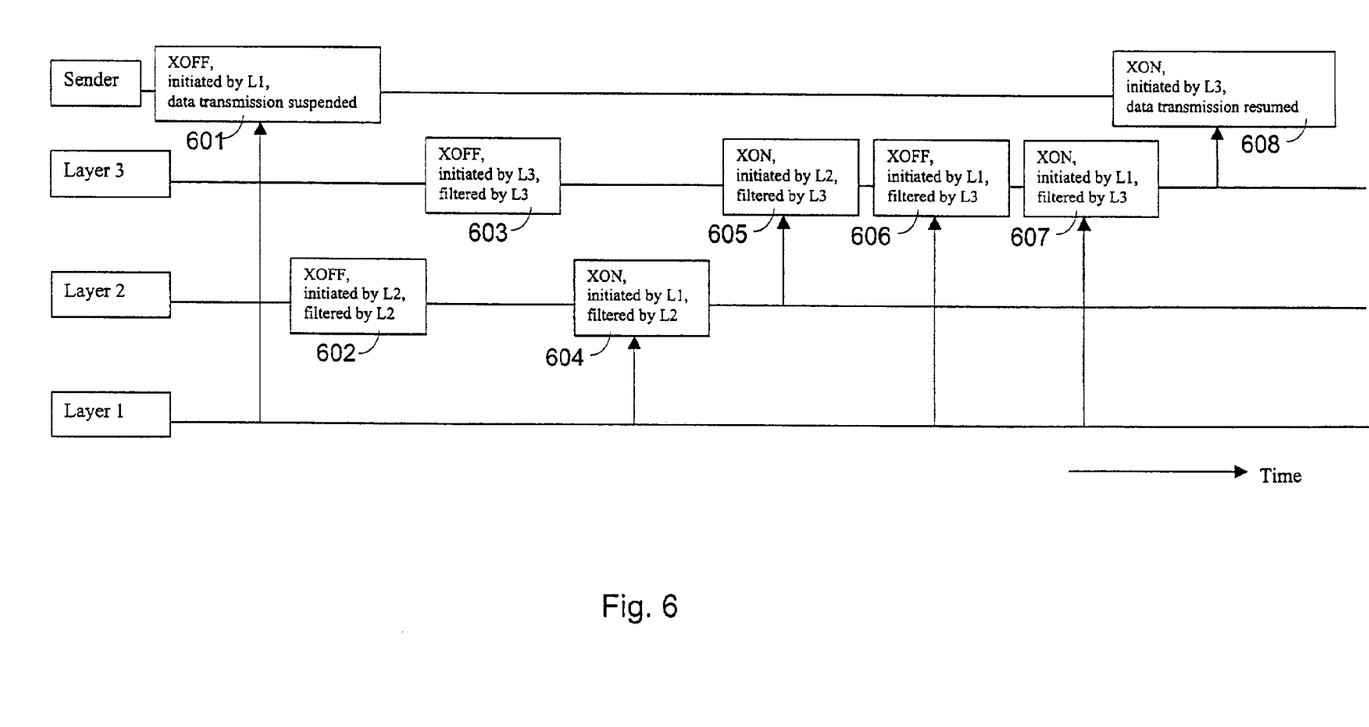
FIG. 6 shows an example of the data flow control.

This embodiment is utilized in the data flow control example shown in FIG. 6. Layer 1 (the protocol entity of the layer 1) initiates suspension by sending a suspension request primitive, i.e. uplink flow indication for suspending data transmission (xx_flow_ind (XOFF)). The layers 2 and 3, both applying filtering functionality, deliver the suspension request forward so that is received by the sender which then suspends 601 the data flow. The layer 2 (L2) stores suspension (XOFF) as the status of the lower layer (L1) and the layer 3 (L3) stores suspension as the status of the lower layer (L2). In 602 the L2 initiates suspension, whereby the suspension request primitive is preferably according to step 405 in FIG. 4 filtered by the L2 and the own status of the L2 is changed (in status information maintained by the L2) into suspension. In 603 the L3 initiates suspension, whereby the suspension request primitive is preferably filtered by the L3 and the own status of the L3 is changed (in status information maintained by the L3) into suspension.

In 604 the L1 is again capable of transmitting data and sends a resume request primitive to the L2. As the status of the L2 is suspension, the L2 filters the primitive and updates the status of the lower layer L1 to indicate the capability to resume. In 605 the L2 is capable of transmitting data and sends a resume request primitive to the L3 and updates it's own status. As the status of the L3 is still suspension, the L3 filters the primitive and updates the status of the lower layer L2. In 606 the L1 initiates suspension, and the suspension request primitive is forwarded by the L2 to the L3 (and the status of the lower layer L1 is changed in the L2 into suspension). The L3 filters the primitive as, according to the status information, suspension request primitive has already been sent to the sender. The L3 also updates the status of the lower layer L2. In 607 the L1 is again capable of transmitting data and sends a resume request primitive to the L2. As the own status of the L2 (in the status information maintained by the L2) due to 605 indicates capability to resume, the L2 sends the resume request primitive to the L3 and updates the status of the lower layer L1. As the own status of the L3 due to 603 indicates incapability to resume, the L3 filters the primitive and updates the status of the lower layer L2. In step 608 also the L3 is capable to resume data transmission, and as the status of the lower layer L2 also enables data transmission, the L3 sends a resume request primitive to the sender and updates the status of the L3. As a response to the resume request primitive, the sender resumes data transmission.

According to a preferred embodiment, the present data flow control method is employed in one or more of the standardized GPRS protocol entities SNDCP, LLC, or RLC. Preferably the method is applied in each one of the layers SNDCP, LLC, and RLC to completely avoid too early resumption of data transmission. The method may also be applied in one or more implementation specific layers (instead of or in addition to one or more standardized protocol layers).

According to another preferred embodiment, the present data flow control method is employed in one or more of the UMTS protocol entities PDCP, RLC. Preferably the method is applied in each on of the layers PDCP and RLC. Also in UMTS, the method may be applied in one or more implementation specific layers (instead of or in addition to one or more standardized protocol layers).

The mobile stations comprise memory and a central processing unit comprising one or more processors. In response to a computer program code stored in the memory and executed in the central processing units, the mobile station can implement the inventive data flow control functionality, some embodiments of which are shown in FIGS. 4 and 5. The computer programs may be obtained through a network and/or they may be stored in memory means, such as a disc, CD-ROM disc or other external memory means from which they can be loaded into the memory. Hardware solutions or a combination of hardware and software can also be used.

A preferred embodiment of the invention for uplink data, i.e. from mobile station MS to network, has been illustrated above. However, the same principle can be utilized also for data transfer in downlink direction. According to one embodiment, the data flow from the network can be suspended and again resumed internally in the mobile station. For instance, if the interface between a laptop (terminal equipment) and the mobile station (mobile termination) is slower than the air interface, downlink flow control can be utilized to decrease air interface speed into the level of terminal's data receiving capability. It is also feasible to apply the above illustrated embodiments in a network element such as a radio network controller.

It will be obvious to a person skilled in the art that, as technology advances, the inventive concept can be implemented in various ways. The invention and its embodiments are not limited to the examples described above but they may vary within the scope of the claims.

The invention claimed is:

1. A method of arranging data flow control in a data transfer system comprising a sender and at least two protocol entities serving the transmission of data from the sender, the method comprising:
    checking the originating protocol entity of a suspension request primitive for suspending data transmission from the sender,
    setting suspension as the data transmission status for the protocol entity that has originated the suspension request primitive,
    sending the suspension request primitive to the sender,
    suspending data transmission by the sender in response to the suspension request primitive,
    checking the originating protocol entity of a resume request primitive before the resume request primitive is transmitted for resuming data flow by the sender, checking the status information, and
preventing the transmission of the resume request primitive if suspension is set for any other protocol entity than the originating protocol entity of the resume request primitive.

2. A method according to claim 1, wherein the data transmission status information is maintained only on the protocol entity applying the method and on the protocol entity underlying the protocol entity applying the method in the protocol stack of the system.

3. A method according to claim 1, wherein further suspension request primitives are prevented from being sent to the sender after the first suspension request primitive has been sent to the sender.

4. A method according to claim 1, wherein a resume request primitive is sent to an upper protocol layer if the status information indicates suspension only for the protocol entity that has sent the resume request primitive, and the data transmission by the sender is resumed in response to the resume request primitive.

5. A method according to claim 1, wherein capability to resume is set as data transmission status for the data protocol entity that has originated a resume request primitive.

6. A method according to claim 1, wherein the method is applied in each protocol entity, except in the lowest protocol entity, capable of initiating data flow control and underlying the sender in the protocol stack of the system.

7. A method according to claim 1, wherein the method is employed in one or more of GPRS protocol entities.

8. A method according to claim 1, wherein the method is employed in one or more of UMTS protocol entities.

9. A data system comprising a sender and at least two protocol entities serving the transmission of data from the sender, wherein
at least one protocol entity is configured to check the originating protocol entity of a suspension request primitive for suspending data transmission from the sender,
at least one protocol entity is configured to set suspension as the data transmission status for the protocol entity that has originated the suspension request primitive,
at least one protocol entity is configured to send the suspension request primitive to the sender,
the sender is configured to suspend data transmission by the sender in response to the suspension request primitives
at least one protocol entity is configured to check the originating protocol entity of a resume request primitive before transmitting the resume request primitive for resuming data flow by the sender,
at least one protocol entity is configured to check the status information, and
at least one protocol entity is configured to prevent the transmission of the resume request primitive if suspension is set for any other protocol entity than the originating protocol entity of the resume request primitive.

10. A data system according to claim 9, wherein the at least one protocol entity is configured to maintain data transmission status information only on itself and on an underlying protocol entity in the protocol stack of the system.

11. A data system according to claim 9, wherein the at least one protocol entity is configured to send a resume request primitive to an upper protocol layer if the status information indicates suspension only for the protocol entity that has sent the resume request primitive, and the sender is configured to resume data transmission in response to the resume request primitive.

12. A data processing device, wherein the data processing device comprises a sender and at least two protocol entities serving the transmission of data from the sender, wherein
at least one protocol entity is configured to check the originating protocol entity of a suspension request primitive for suspending data transmission from the sender,
at least one protocol entity is configured to set suspension as the data transmission status for the protocol entity that has originated the suspension request primitive,
at least one protocol entity is configured to send the suspension request primitive to the sender,
the sender is configured to suspend data transmission by the sender in response to the suspension request primitive,
at least one protocol entity is configured to check the originating protocol entity of a resume request primitive before transmitting the resume request primitive for resuming data flow by the sender,
at least one protocol entity is configured to check the status information, and
at least one protocol entity is configured to prevent the transmission of the resume request primitive if suspension is set for any other protocol entity than the originating protocol entity of the resume request primitive.

13. A data processing device according to claim 12, wherein the at least one protocol entity is configured to maintain data transmission status information only on itself and on an underlying protocol entity in the protocol stack of the system.

14. A data processing device according to claim 12, wherein the at least one protocol entity is configured to send a resume request primitive to an upper protocol layer if the status information indicates suspension only for the protocol entity that has sent the resume request primitive, and
the sender is configured to resume data transmission in response to the resume request primitive.

15. A computer software product stored on a computer readable medium for controlling a data processing device comprising a sender and at least two protocol entities serving the transmission of data from the sender, wherein the computer software product comprises:
a program code for checking the originating protocol entity of suspension request primitive for suspending data transmission from the sender,
a program code for setting suspension as the data transmission status for the protocol entity that has originated a suspension request primitive,
a program code for sending at least one suspension request primitive for the sender,
a program code for suspending data transmission by the sender in response to the suspension request primitive,
a program code for checking the originating protocol entity of the resume request primitive before transmitting the resume request primitive for resuming data flow by the sender,
a program code for checking the status information, and
a program code for preventing the transmission of the resume request primitive if suspension is set for any other protocol entity than the originating protocol entity of the resume request primitive.

* * * * *